(12) United States Patent
Schwarm et al.

(10) Patent No.: US 11,238,233 B2
(45) Date of Patent: Feb. 1, 2022

(54) ARTIFICIAL INTELLIGENCE ENGINE FOR GENERATING SEMANTIC DIRECTIONS FOR WEBSITES FOR AUTOMATED ENTITY TARGETING TO MAPPED IDENTITIES

(71) Applicant: THE DUN & BRADSTREET CORPORATION, Short Hills, NJ (US)

(72) Inventors: Alexander T. Schwarm, Austin, TX (US); James Beveridge, Brooklyn, NY (US); Dane Anthony Macaulay, Austin, TX (US); Anudit Vikram, Kew Gardens, NY (US)

(73) Assignee: THE DUN AND BRADSTREET CORPORATION, Short Hills, NJ (US)

( * ) Notice: Subject to any disclaimer, the term of this patent is extended or adjusted under 35 U.S.C. 154(b) by 270 days.

(21) Appl. No.: 16/515,912

(22) Filed: Jul. 18, 2019

(65) Prior Publication Data
US 2020/0026759 A1 Jan. 23, 2020

Related U.S. Application Data

(60) Provisional application No. 62/699,983, filed on Jul. 18, 2018.

(51) Int. Cl.
*G06F 40/30* (2020.01)
*G06K 9/62* (2006.01)
(Continued)

(52) U.S. Cl.
CPC ............ *G06F 40/30* (2020.01); *G06F 16/953* (2019.01); *G06K 9/6267* (2013.01); *G06N 7/00* (2013.01); *G06N 20/00* (2019.01); *H04L 67/02* (2013.01)

(58) Field of Classification Search
None
See application file for complete search history.

(56) References Cited

U.S. PATENT DOCUMENTS

| 7,239,959 B2 * | 7/2007 | Rasmussen ........ G01C 21/3641 342/357.57 |
| 2010/0185659 A1 | 7/2010 | Bai et al. |

(Continued)

OTHER PUBLICATIONS

International Search Report dated Oct. 3, 2019 in corresponding PCT International Patent Application No. PCT/US2019/042432, 2 pages.

(Continued)

*Primary Examiner* — Quynh H Nguyen
(74) *Attorney, Agent, or Firm* — Ohlandt, Greeley, Ruggiero and Perle, LLP

(57) ABSTRACT

A method and system for employing a Language Processing machine learning Artificial Intelligence engine to employ word embeddings and term frequency-inverse document frequency to create numerical representations of document meaning in a high-dimensional semantic space or an overall semantic direction. This semantic direction can be used to quantitatively measure semantic similarity between online content consumed by a potential prospect and a given product or product family. The AI can automate the process of creating audiences for on-line marketplaces for programmatic advertising purposes by using representative product descriptions, such as a grouping of product descriptions for scalable, cloud-based databases, and then creating a hyper-focused intent-based audience based on companies that are showing a significant increase in intent.

25 Claims, 7 Drawing Sheets

(51) Int. Cl.
   *G06N 7/00* (2006.01)
   *G06F 16/953* (2019.01)
   *H04L 29/08* (2006.01)
   *G06N 20/00* (2019.01)

(56) References Cited

U.S. PATENT DOCUMENTS

| | | | |
|---|---|---|---|
| 2013/0132365 | A1 | 5/2013 | Chang et al. |
| 2013/0246322 | A1 | 9/2013 | De Sousa Webber |
| 2016/0350288 | A1 | 12/2016 | Wick et al. |
| 2017/0228771 | A1 | 8/2017 | Singh et al. |

OTHER PUBLICATIONS

Written Opinion dated Oct. 3, 2019 in corresponding PCT International Patent Application No. PCT/US2019/042432, 8 pages.

Bojanowski et al, "Enriching Word Vectors with Subword Information", Transactions of the Association for Computational Linguistics, vol. 5, pp. 135-146, 2017, Hinrich Schütze.

Devlin et al, "BERT: Pre-training of Deep Bidirectional Transformers for Language Understanding", Proceedings of NAACL-HLT 2019, pp. 4171-4186, Minneapolis, Minnesota, Jun. 2-Jun. 7, 2019.

Mikolov et al, "Efficient Estimation of Word Representations in Vector Space", arXiv: 1301.3781v3 [cs.CL] Sep. 7, 2013.

Pennington et al, "GloVe: Global Vectors for Word Representation", 2014, 12 pages.

Peters et al, "Deep contextualized word representations", Proceedings of NAACL-HLT 2018, pp. 2227-2237, New Orleans, Louisiana, Jun. I-6, 2018.

Yang et al, "XLNet: Generalized Autoregressive Pretraining for Language Understanding", arXiv: 1906.08237v1 [cs.CL] Jun. 19, 2019, 18 pages.

International Preliminary Report on Patentability dated Jun. 26, 2020 in corresponding PCT International Patent Application No. PCT/US2019/042432, 11 pages.

* cited by examiner

ARTIFICIAL INTELLIGENCE ENGINE FOR GENERATING SEMANTIC DIRECTIONS FOR WEBSITES FOR AUTOMATED ENTITY TARGETING TO MAPPED IDENTITIES

CROSS REFERENCE TO RELATED APPLICATION

The present application claims foreign priority to U.S. Provisional Patent Application No. 62/699,983 filed on Jul. 18, 2018, the entirety of which is incorporated by reference hereby.

BACKGROUND OF THE DISCLOSURE

1. Field of the Disclosure

The present disclosure relates to a system and a method for Business Intelligence, Customer Relationship Management (CRM) Systems, Marketing Automation Platforms, and Web Analysis Systems.

2. Description of the Related Art

Current systems for analyzing intent, for example as used by CRM Systems, Business Intelligence, and Web Analysis Systems, force marketers to select a set of single words to use for determining what a potential prospect may be searching for related to their product.

Marketers must make a mental map of their product and positioning to a set of these arbitrarily defined key-words.

This leads to inaccurate results from words with multiple meanings, other linguistic issues, or simply missing the "right words."

This also forces a difficult setup experience by making marketers search through up to 2,000 or more words to find the words that are related to their product. Even in the case where the key words can be chosen, the same linguistic and mapping issues arise.

SUMMARY OF THE DISCLOSURE

The following briefly describes a basic understanding of some aspects of the embodiments. Its purpose is merely to present some concepts in a simplified form as a prelude to the more detailed description that is presented later.

Described herein are embodiments of a computer system, method, and computer program products for using machine intelligence.

In an embodiment, the system is configured to define a "Semantic Direction" for a set of content based on converting the words used in the content (and the usage of words across the entire data set) to a numerical representation of the meaning of the content. This allows the system to convert a client user's product content to a "Semantic Direction."

In an embodiment, the system can calculate the "signal strength" for a given prospect business entity and the client user's product content, measure the change in signal strength to determine if there was a statistically significant change, and provide a client with prospect companies, for example:

Cross Sell Opportunity: For an existing customer, a significant increase in product signal strength for a different product.

New Sales/New Logos: A significant increase in product signal strength for business entities that are not existing customers of the client user.

Potential Larger Sales: For business entities that are not existing customers, a significantly higher product signal strength compared to other similarly identified business entities.

The arrangement of databases, mapping, and classifiers provide an improved prospect targeting platform that includes the following, non-limiting advantages over current Customer Relationship Management (CRM) systems.

No Keywords Needed

The client user's description of their product and the content being viewed by the prospect is used to determine if there is alignment and interest; there is no filter that both pass through that is based on arbitrarily defined keywords.

There is no artificial, restrictive taxonomy that must be used for defining products and content.

Higher confidence results are obtained using meanings derived from entire documents rather than single words (that could have multiple meanings or other linguistic issues).

Clear and Actionable Insights, Automated and Rapid Value Delivery

Clear and time-relevant reports and interfaces that immediately uncover opportunities for: cross-sell, new sales, and larger sales.

Leverages the best word2vec artificial intelligence models incorporating huge databases of content (600B words).

Automated analysis is done based on a client user's own web content or any other supplied product content.

Detect Signal Strength for ABM Engagements and Complex Family Trees

Enables signal strength to be generated based on business family trees (rather than just domains), a critical element for Account Based Marketing ("ABM") and determining intent.

Further non-limiting advantages of the innovations described herein include the following:

The elimination of all of the issues caused by requiring the use of arbitrarily defined keywords from human, subjective judgement.

The automated analysis of very large quantities of content text while retaining very nuanced semantic representation of the content.

The automated analysis of product content while retaining very nuanced semantic representation of the product content.

The ability to easily scale to very large numbers of specific types of product-oriented audiences and then use this to create many specific product-oriented taxonomies in marketplaces related to programmatic advertising.

In embodiments, described are systems and processes therefor configured to perform analysis for a single product or a similar family of products that a client sells, which can also be applied to other products or product families. Described herein are embodiments of a system and processes therefor, configured to collect all words presented in the web page content and classify the word content by employing a language processing classifier. In an embodiment, the system configured with a natural language processing (NLP) classifier including word embeddings and term frequency. In another embodiment, the system is configured to with a language-model-based system. The system is configured to perform an inverse document frequency (TF-IDF) to define a "semantic direction" associated with the web page content and the corresponding product.

Accordingly, in an embodiment, described herein is a method, and computer system and computer program product for the method being performed by a computer system that comprises one or more processors and a computer-readable storage medium encoded with instructions executable by at least one of the processors and operatively coupled to at least one of the processors, the method comprising: analyzing a set of web data traffic content for a website, the web data content comprising content such as web page content being accessed, mobile IDs, IP addresses, and web browser cookies. The system can be configured to map the web data traffic content to a business entity identifier to identify a business entity visiting the website; map the web traffic data content to personnel data for the business entity associated with the business entity identifier to identify business personnel associated with the business entity visiting the website; and for each webpage address of the website accessed by the business entity or the business personnel associated with the business entity identifier, generate a word database comprising words from the webpage at the webpage address. The system can be configured to analyze the word database with a language processing classifier to generate word embeddings; generate a semantic direction value for the word database; and identify the business entity intent based on the semantic direction value.

Accordingly, embodiments as described herein provide a technology solution that improves over conventional CRM Systems, Business Intelligence Systems, and Web Analysis Systems, which rely on subjective human judgement and less robust prospect identification. Such systems introduce mistargeting, and further fail to identify proper prospects. For example, because Zappos has shown increased interest in CRM software does not mean that Amazon.com will be buying new CRM software. Likewise, if Amazon Web Services HQ, Amazon Web Services Germany, and Amazon Web Services Australia are all showing increased interest in accounting firms, that is a stronger signal than just having many visitors just from Amazon Web Services HQ.

Embodiments as described herein can be used to define audiences that are demonstrating interest or intent to buy products based on the characteristics of content that an audience is engaging with online. The methodology leverages language processing techniques, such as word embeddings and term frequency-inverse document frequency, to create numerical representations of document meaning in a high-dimensional semantic space or an overall semantic direction. This semantic direction can be used to quantitatively measure semantic similarity between online content consumed by a potential prospect and a given product or product family. The count of visitors for a given prospect company that is consuming content with a high degree of semantic similarity can then be tracked over time and, if a significant increase is detected, the prospect company can be inferred to have an increased level of intent or interest in a given product. This same analysis can be executed not just for a single business entity; it can also be applied to measure intent across entities within a family tree context. Furthermore, this capability can be used to automate the process of creating audiences for on-line marketplaces for programmatic advertising purposes by using representative product descriptions, such as a grouping of product descriptions for scalable, cloud-based databases, and then creating a hyper-focused intent-based audience based on companies that are showing a significant increase in intent based on the aforementioned methodology. Further, language processing and word embeddings can be used to analyze tera-scale data sets to determine audiences and measure intent related to a specific audience. In at least one embodiment, the system can be configured to employ definitions for different types of products.

BRIEF DESCRIPTION OF THE DRAWINGS

Embodiments will now be further described, by way of example only, with reference to the accompanying drawings.

DETAILED DESCRIPTION OF THE EMBODIMENTS

Various embodiments now will be described more fully hereinafter with reference to the accompanying drawings, which form a part hereof, and which show, by way of illustration, specific embodiments by which the disclosure may be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices. The following detailed description is, therefore, not to be construed in a limiting sense.

Throughout the specification and claims, the following terms take the meanings explicitly associated herein, unless the context clearly dictates otherwise. The term "herein" refers to the specification, claims, and drawings associated with the current application. The phrase "in embodiments" or "in embodiments" as used herein does not necessarily refer to the same embodiment, though it may. As described below, various embodiments of the present disclosure can be readily combined, without departing from the scope or spirit of the present disclosure.

In addition, as used herein, the term "or" is inclusive, and is equivalent to the term "and/or," unless the context clearly dictates otherwise. In addition, throughout the specification, the meaning of "a" "an" and "the" include plural references. The meaning of "in" includes "in" and "on".

In the following detailed description reference is made to language processing which is a field of computer science, artificial intelligence (AI), and computational linguistics concerned with the interactions between computers and human (natural) languages. One AI data analysis approach is based on identifying semantic directions, which is an AI task.

Figure 1:
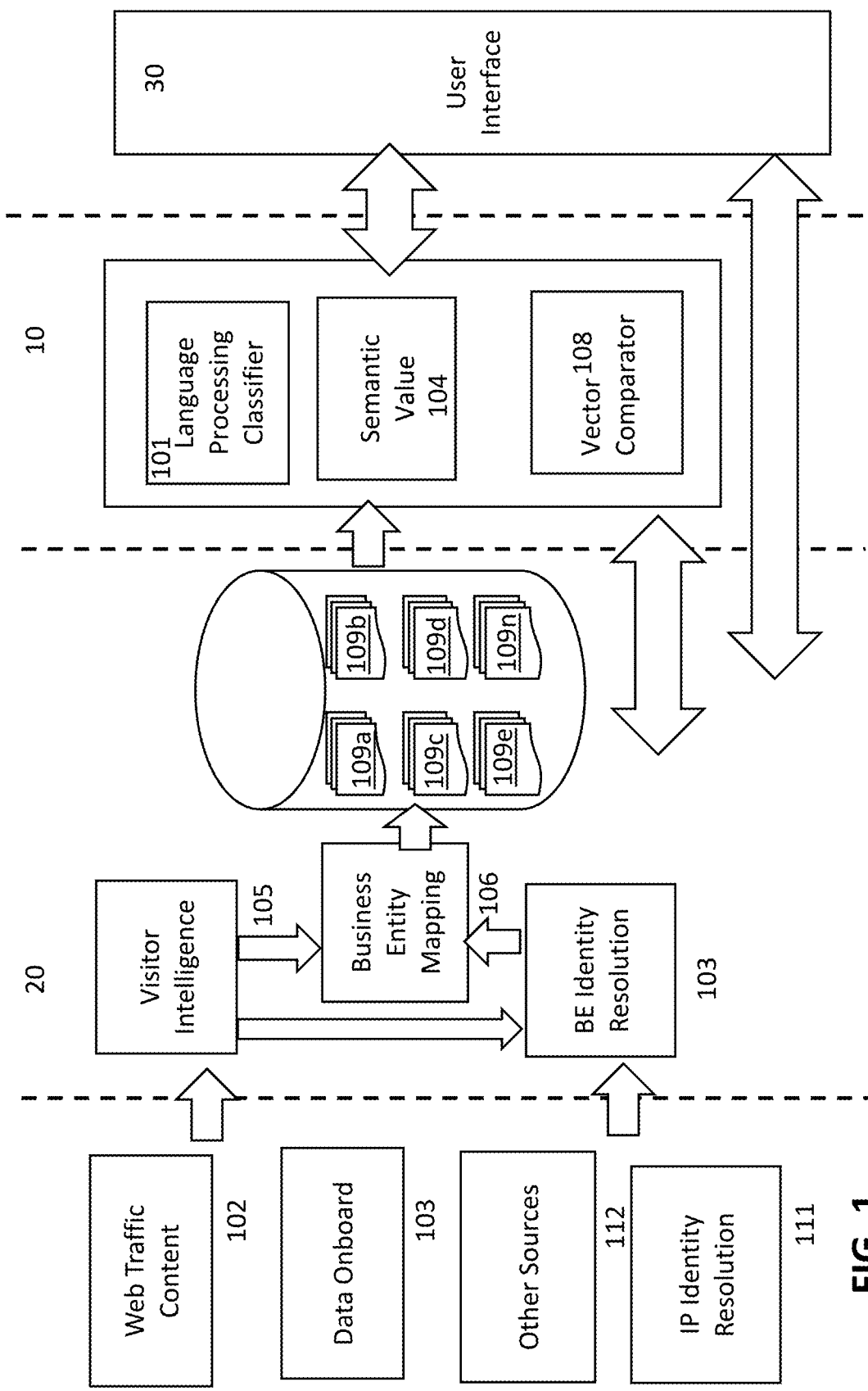
FIG. 1 is a block diagram of logical architectures for an embodiment.
Figure 2:
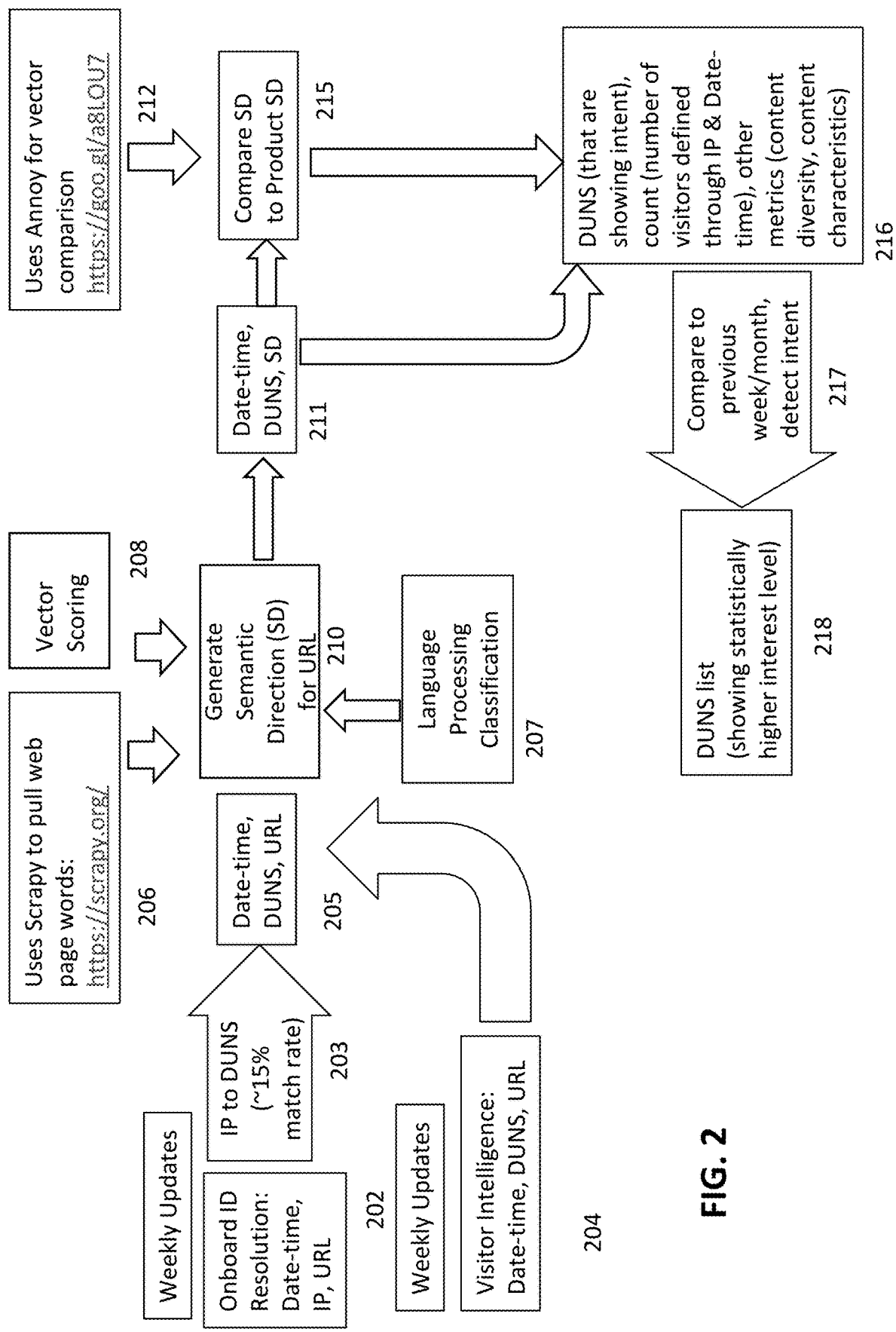
FIG. 2 is a diagram of a flow chart showing a process in accord with an embodiment.

Referring to FIG. 1, the system is generally represented by reference numeral 100 and illustrates a block diagram of logical architectures and modules for an embodiment. FIG. 2 is a flow chart showing a process in accordance with the embodiment. At block 202, the system is configured to analyze a set of web data traffic content 102 for a website.

The web data content can be the web page content being accessed (e.g., an article, a product page, any web page from a site), IP addresses, mobile IDs, and web browser cookies. For example, in an embodiment, the system can be configured to include or interface with an identity resolution and data onboarding platform 107. For example, the system could perform identity resolution or interface with platforms 111, 112, 107, (for example, platforms such as LiveRamp™, Neustar™, Acxiom™, etc.) to access and onboard web data traffic content 102 or perform or obtain identity resolution data for business entities associated with an IP address. Identity resolution can be done using IP Identity Resolution technology platforms 111 and tools as known in the art, for example, by matching cookie data to IP addresses, synching cookie pools, etc.

At block 203 the system is configured to obtain the web traffic content data 102. For example, at block 203 a business entity platform 20 server can comprise a business entity identity resolution module that matches each of the web traffic IP addresses with a business identification number, for example, a DUNS number (hereinafter referred to simply as "DUNS"), from a business entity information database. In an embodiment, initial mapping in a robust business information database can be, for example, at a 10-20% percent match rate (e.g. 15%).

In an embodiment, at block 203 the system can be configured to identify, for a given business entity identifier, a number of other, unique business entity identifiers in a business organizational tree for the given business entity identifier. For example, for a given DUNS number, the system can be configured to calculate the number of unique DUNS numbers associated with an appropriate family tree representation related to this given DUNS number. The family tree representations associated with a given DUNS number can comprise, for example, common franchisees, DUNS with minority ownership, DUNS that are all beneath a headquarters with a high propensity to be a buying decision maker for the family tree members underneath (such as identified by Dun & Bradstreet's Decision HQ platform); DUNS with a common headquarters, a common domestic ultimate, or a common global ultimate based on legal connections (less than 50% ownership); DUNS with a common headquarters, a common domestic ultimate, or a common global ultimate based on analysis of brands used within a set of DUNS, DUNS with a common headquarters, a common domestic ultimate, or a common global ultimate based on a combinations of the aforementioned items. An exemplary system for linking a given business entity identifier, a number of other, unique business entity identifiers in a business organizational tree for the given business entity identifier is described in U.S. patent application Ser. No. 14/926,033, U.S. Pat. Pub. No. 2017-0124132 A1, filed on Oct. 29, 2015, and entitled "Data Communications System and Method that Maximize Efficient Usage of Communications Resources", the entirety of which is incorporated by reference hereby.

The system can also include a business entity mapping module 106 that is configured to analyze and map web traffic content data for personnel data for the business entity associated with the business entity identifier, for example to identify business personnel by Job Function, Job Title, Persona Related, and Job Seniority.

At block 204, the system is configured to obtain visitor intelligence data 105, and at block 205 the business entity mapping module 106 is configured to map the web traffic data content 102 to visitor intelligence data 105, for example, personnel data for the business entity associated with the business entity identifier to identify business personnel associated with the business entity visiting the website.

Non limiting examples of company entity data linking, generating firmographic databases and scoring for companies, and data integration from a business entity information database by a business analytics server are described in U.S. Pat. No. 7,822,757, filed on Feb. 18, 2003 entitled "System and Method for Providing Enhanced Information", and U.S. Pat. No. 8,346,790, filed on Sep. 28, 2010 and entitled "Data Integration Method and System", the entirety of each of which is incorporated by reference herein. The firmographic or other attribute data (e.g. the company name, address, and ranking/evaluation/risk scores) can also be associated with the entity that owns the IP address.

At block 205, the system is configured to map the web data traffic content 102 to a business entity identifier to identify a business entity visiting the website.

At block 206, for each webpage address of the website accessed by the business entity or the business personnel associated with the business entity identifier, the system is configured to generate a word database 109a-109n comprising words from the webpage at the webpage address. For example, in an embodiment, the system can employ a web data extraction tool, for example, an application framework for crawling web sites and extracting structured data. An example of such an application framework includes the Scrapy 1.5 web crawling and scraping application, which can be used for a wide range of useful applications, like data mining, information processing or historical archiving.

At block 207, the system is configured analyse the word database with a language classifier 101 configured to generate word embeddings. In an embodiment, the language processing classifier configured to analyze the word database with a Natural Language Processor (NLP) classifier 101. In an embodiment, the system is configured to include vector comparator 108 comprising a word vector classifier, for example a trained classifier module such as Fasttext (Fasttext: P. Bojanowski*, E. Grave*, A. Joulin, T. Mikolov, *Enriching Word Vectors with Subword Information*); Global Vectors for Word Representation GloVe (GloVe: Global Vectors for Word Representation Jeffrey Pennington, Richard Socher, Christopher D. Manning Computer Science Department, Stanford University, Stanford, Calif. 94305 jpennin@stanford.edu, richard@socher.org, manning@stanford.edu); or Word2vec: Mikolov, Tomas; et al. "Efficient Estimation of Word Representations in Vector Space". arXiv:1301.3781.

In an embodiment, the language processing classifier 101 is configured to employ a language-model-based classifier module to generate the word embeddings. The classifier generates word embeddings by mapping each word to a vector to produce on a large set of contextual information that is related to the word being mapped. The vector is not only determined by the word itself; it is also determined by other words before and after the word that is being mapped to a vector. Language-model-based classifier modules can include a classifier module such as ElMo (Peters, Matthew E., Neumann, Mark, Iyyer, Mohit, Gardner, Matt, Clark, Christopher, Lee, Kenton and Zettlemoyer, Luke, "*Deep Contextualized Word Representations*," Proc. of NAACL, 2018); a BERT module (3: Jacob Devlin, Ming-Wei Chang, Kenton Lee, Kristina Toutanova, "BERT: *Pre-training of Deep Bidirectional Tranformers for Language Understanding*", arXiv:1810.04805 [cs.CL], 2018); or XLNet (4: Zhilin Yang, Zihang Dai, Yiming Yang, Jaime Carbonell, Ruslan Salakhutdinov, Quoc V. Le, "XLNet: Generalized Autoregressive Pretraining for Language Understanding", arXiv: 1906.08237 [cs.CL], 2019).

At block 208, in an embodiment, the system scores and weights the vector space using a vector scoring module 107. In an embodiment, the system is configured to can analyze the word database 109a-n employing inverse document frequency (IDF) to analyze the word database. For example, the system is configured to analyze the word database 109a-n with a machine learning model selected from the group including word embeddings, term frequency and inverse document frequency (TF-IDF), which is used by a semantic value module 104 to generate a semantic direction value to identify the business entity intent based on the semantic direction value. In an embodiment, the system can be configured to include a semantic value module 104, for example, the scikit-learn application framework (e.g., scikit-learn 0.19.1), to employ inverse document frequency (TF-IDF).

The system can be configured to establish a word embeddings model comprising a semantic vector generated for a dictionary which includes singular words (unigrams) and groups of words (n-grams), wherein the frequency of co-occurrence of words within a defined window within the corpus creates a correlation between words that generates a semantic relationship between words. The system can be configured to identify the ngrams across the corpus such that unigrams within a ngram are not represented in the analysis. For example, first, a word embeddings model is created, or an existing model is used such as those that have been created through Google [Tomas Mikolov, Kai Chen, Greg Corrado, and Jeffrey Dean "Efficient Estimation of Word Representations in Vector Space". In Proceedings of Workshop at ICLR, 2013.], GloVe [Jeffrey Pennington, Richard Socher, and Christopher D. Manning. 2014, "GloVe: Global Vectors for Word Representation".], Fastext ([Bojanowski, Piotr, Grave, Edouard, Joulin, Armand, Mikolov, Tomas, "Enriching Word Vectors with Subword Information", arXiv preprint arXiv:1607.04606, 2016]), or ELMo [Peters, Matthew E., Neumann, Mark, Iyyer, Mohit, Gardner, Matt, Clark, Christopher, Lee, Kenton, Zettlemoyer, Luke, "Deep contextualized word representations", Proc. of NAACL, 2018]). This model is created employing a standard methodology where a semantic vector is created for a dictionary which includes singular words (unigrams) and groups of words (n-grams). The frequency of co-occurrence of words within a defined window within the corpus creates a correlation between words that generates a semantic relationship between words. This word embeddings model, which typically translates a ngram into a 300-dimensional numeric vector, can be used as a core component in creating the semantic direction of a given document or set of content.

The ngrams are identified across the corpus such that unigrams that within a ngram are not represented in the analysis. For example, the phrase "new york" does not include both the ngram "new york" and the unigram "new".

Next, stopwords are removed from the corpus. For example, a large number of stopwords, or words which have minimal usage in the analysis, are removed (e.g., "I", "us", "the", "and", etc.).

The system is configured to employ the inverse document frequency model (TF-IDF) model to weight the ngrams or words in the groups of content provided. Each ngram in the document is given a weight that increases the importance of this ngram based on the frequency the ngram is used in the document, the frequency the word is used in other documents, or both. As such, a term frequency—inverse document frequency model (TF-IDF) model is used to weight the ngrams or words in the groups of content provided. This gives a weight for each ngram in the document that increases the importance of this ngram if the ngram is frequently used in the document and/or less frequently used in other documents.

In an embodiment, where each ngram is indexed by an index i, the system is configured to sum each ngram, i, across all ngrams in the jth document, $d_j$, in the corpus, weighted by the $i^{th}$ weight from the TF-IDF weighting for doc j, $w_{i,j}$, and the related word embedding from the word embedding model, W[i], gives the semantic direction, $s_j$:

$$s_j = \sum_{i \in d_j} w_{i,j} \cdot W[i]$$

The word embeddings model is thus configured to translate the ngram into a 300-dimensional numeric vector. The ngram is given greater weight if the ngram is frequently used in the document, less frequently used in other documents, or both.

In another embodiment, at block 208, when a classifier generates word embeddings by mapping each word to a vector to produce on a large set of contextual information that is related to the word being mapped, the system can be configured to employ scoring of the vector space, for example IDF scoring and weighting. As noted above, with contextual word mapping, the vector is not only determined by the word itself; it is also determined by other words before and after the word that is being mapped to a vector. As such, the system can be configured to perform IDF weighting and scoring of the vector space (as opposed to raw term frequency or term frequency enhanced IDF), which can be configured on the contextualized mapping of words based on varied meanings of the same word (e.g.: multiple contextual meanings for "play" having different contexts for music, sport, children, and operation of devices).

As described above the system can be configured to generate the semantic value using a number of vector modules, for example, run with scikit-learn, spaCy NLP (v2.0), Natural Language Toolkit (NLTK 3.4.4). TensorFlow (APR 1, 2) PyTorch (1.1.0), scikit-learn (0.21.02), or Gensim (3.8.0). For example, the system can also be configured to run TensorFlow or PyTorch to run neural nets such as ELMo (0.8.4) or BERT to generate word embeddings with context to obtain word embedding values together with the semantic values.

In an embodiment, the system language processing classifier 101 is also configured to classify the content being consumed by the visitors into buying content and non-buying. If a set of visitors are predominantly consuming content related to buying, then those visitors are classified as being in a buying state. If visitors are consuming content that is not related to buying (e.g.: predominantly more informational content or content related to learning) then those visitors as classified a relatively lower buying state. Thus, the system is also configured to classify content as to whether that content is related to buying. The system can also be configured to provide a score as to the confidence as to whether that content is related to buying. The classification can be performed by classifiers as described herein, for example Fasttext, ElMo, BERT, or XLNET. The model is trained on the corpus of text that has been classified, and then the classifier used to classify whether a webpage is related to buying, as well as a confidence score associated with that classification. For example, a set of visits for a specific company over a specified time frame can be assessed by analyzing the scores for all of these visits. The system can be configured to employ any number of analyzers to assess these combined sets of visits, and thus assess the buying intent of the company associated with these visits. For example, an analysis module can be configured to averaging the results and generate a linear score from 0 to 100. For a nonlinear score, the analyzer can be configured to employ a soft-thresholded score that has a sigmoid like behavior with a zero intercept between 0 and 100.

At block 210 the system is configured to generate a semantic direction value for the word database and identify the business entity intent based on the semantic direction value.

In an embodiment, the system is configured to identify a number of the unique visitors to the website associated with the business entity identifier during a plurality of time intervals for a period of time. For example, at block 211, for each business entity that visited the website, the system logs the date and time, the business entity identifier mapped of the visitor, and the semantic direction value of the webpage.

The system can also be configured to generate the semantic direction value for the content and an identified product or product family. The system can be configured to calculate the similarity of a set of content or a document for a webpage to a product content, for example a product description for a product or family of products.

For example, in an embodiment, the system can be configured to generate a taxonomy of product types based on a representative product content. The system can then calculate a semantic value of a representative set of products. In an embodiment, the system employs a machine learning algorithm for document classification to classify and be applied to a database of product categories or text definitions for products to correlate the semantic direction with one or more entities. The system can then be configured to define a target product audience based on the correlation.

For market places where a client's product information is not readily available, a taxonomy of product types can be created based on representative product content. For example, an audience could be created for security software by creating a semantic direction for a representative set of security software related products. Using an automated method, incorporating data sets that give text definitions of product categories or relate product categories with a specific company's specific products, a very large number of product-based audiences could be automatically created which would allow for hyper-targeting for very specific intent or interest.

Accordingly, an exemplary advantage of embodiments as described herein is the improvement of programmatic advertising technology. In programmatic advertising, companies typically go to a marketplace and select an audience based on criteria. Unfortunately, these criteria might not map to their specific product. Embodiments as described herein are configured to create a set of companies that have surging interest in very specific products. To do this, the system is configured to obtain and leverage text and definitions describing many different products to find the semantic direction to use to compare against the online content, and find any companies that have a surging interest in content that has a semantic direction that is closely aligned to this product semantic direction. For example, the product descriptions can be obtained from a set of documented product definitions, for example payroll management software as software used for tracking, or sets of representative product documentation, for example, a web page for ADP's payroll management products, and the web page for Intuit's payroll management products. Embodiments of semantic value generation as described herein improves programmatic advertising by the creation of thousands of product-specific audiences without having to do conventional keyword analysis or other more manual techniques.

In an embodiment, the system can be configured to compare a webpage semantic direction value with a product semantic direction value. For example, at block 212 the system can be configured with a vector comparator module 108, for example, a nearest neighbor engine. An exemplary vector comparison application framework for a vector comparator module 108 includes, Annoy (Approximate Nearest Neighbors Oh Yeah), a C++ library with Python bindings to search for points in space that are close to a given query point. It also creates large read-only file-based data structures that are mapped into memory so that many processes may share the same data. At block 215, the semantic direction values for the webpage URL as described herein is compared to the product semantic direction using the vector comparison. In an embodiment, the vector comparison can be calculated as a cosine angle or a Euclidean distance for the semantic directions for the set of content or document to the product content. As will be appreciated, other vector comparator modules 108 can be employed as well.

At block 216, the system is configured to correlate business entities with the semantic direction for the webpage and/or the semantic vector for the product or family of products, for example using the business entity mapping module 106. As will be appreciated, having objectively established the semantic direction for the website and/or products, the identified business entities DUNS that are showing intent can be targeted at a much more accurate and granular level, for example by count (number of visitors defined through IP address and date-time) and other metrics (e.g., content diversity, content characteristics).

In an embodiment, the system employs recursive machine learning for system robustness, and to accurately and objectively measure intent and an intent change over time.

In an embodiment at block 202 the system collects a number the unique visitors to the website associated with the business entity identifier during plurality of time intervals for a period of time. For example, the system can be configured to collect the number of unique visitors on a weekly time interval. The unique visitors can then be updated at weekly intervals for a period of time, for example, three to twelve weeks. The system can then be configured to calculate a statistical estimate of the number of unique visitors for each interval for the period of time and compare each interval to the prior interval, for example, the current week to the prior week. The system is then configured to identify any deviations by detecting a shift between the analyzed intervals and calculate the magnitude of the shift. For example, the system can be configured to calculate the statistical estimate as an inner quartile range or a median absolute deviation of the number of unique visitors.

In an embodiment, the system is configured to perform the analysis using one or more time windows. For instance, the system can employ a plurality of time windows of different time intervals, for example, a weekly time interval, a bi-weekly interval, and/or a monthly interval. Other intervals can be employed, for example, a monthly interval, a bi-monthly interval, a quarterly interval, and so on. The system can be configured to recalculate the statistical estimate of the number of unique visitors for the period of time (e.g., 3-4 months) for each the plurality of time windows, e.g., each week, each bi-week, and each month. The system can then be configured to calculates the magnitude of the shifts based on the recalculations for the time windows.

In an embodiment, the system can be configured collect the number of unique visitors to the website associated with the business organizational tree (see block 203) for the given business entity identifier for a period of time. The system can then be configured to calculate the statistical estimate, for example as an inner quartile range or a median absolute deviation of the number of unique visitors and unique business entity identifiers in the family tree.

For example, in an embodiment, the system is configured to use standard statistical techniques to detect shifts in the number of unique visitors for a business identifier (e.g., a DUNS number) for a business entity or a business identifier for an appropriate family tree representation. An example of this includes: collecting the number of unique visitors and the number of unique DUNS associated with the appropriate family tree representation on a weekly basis for a period of time, such as eight weeks. The system then can estimate an appropriate robust statistic, such as inner quartile range or median absolute deviation, of the number of unique visitors and unique DUNS in a defined family tree representation. The system then is configured to apply this analysis using weekly windows, biweekly windows, and monthly windows. These estimates are used to identify spikes or shifts in the number of unique visitors and number of unique DUNS by detecting shifts that are significant. Possible estimates for statistically significant difference include an absolute difference between the median and the measured which is 1.5 times the inner quartile range, or 3 times the median absolute deviation. This is then calculated across weekly time scales, bi-weekly time scales, and monthly time scales to determine the magnitude of the shift. For example, for estimating weekly variance, the variance in the average number of weekly visitors for a given DUNS for a given well-aligned semantic direction can be estimated as:

$$v_w = \frac{1}{\sqrt{n_w}} \sum_{i=1}^{n_w} [\bar{x}_i - x_i]^2$$

Other statistical methods can be used for measuring statistically significant shifts and variations, including Poisson distributions, Binomial distributions, or zero-inflated versions of the Poisson or Binomial distribution. Where $v_w$ is the weekly variance, $n_w$ is the number of weeks in the analysis, $x_i$bar is the average weekly numbers of unique visitors for a given DUNS and given well-aligned semantic direction, and $x_i$ is the number of unique visitors for a given DUNS and given well-aligned semantic direction for the $i^{th}$ week At block 218, a report can be generated for a client user, for example, an interface showing a list of business entities showing statistically higher interest.

For example, for client user, the system is configured to provide a report that shows those DUNS that are demonstrating increased interest/intent in a set of semantic directions that are consistent with the product/offering semantic directions and those that are not existing customers. The client user is provided with a report that shows those DUNS that are demonstrating increased interest/intent in a set of semantic directions that are consistent with the product/ offering semantic directions, and that are existing customers for a different product. The measure of how similar a set of content or a document is when compared to product content can be generated using techniques such as cosine angle or Euclidean distances for the semantic directions that are defined for each.

Figure 6:
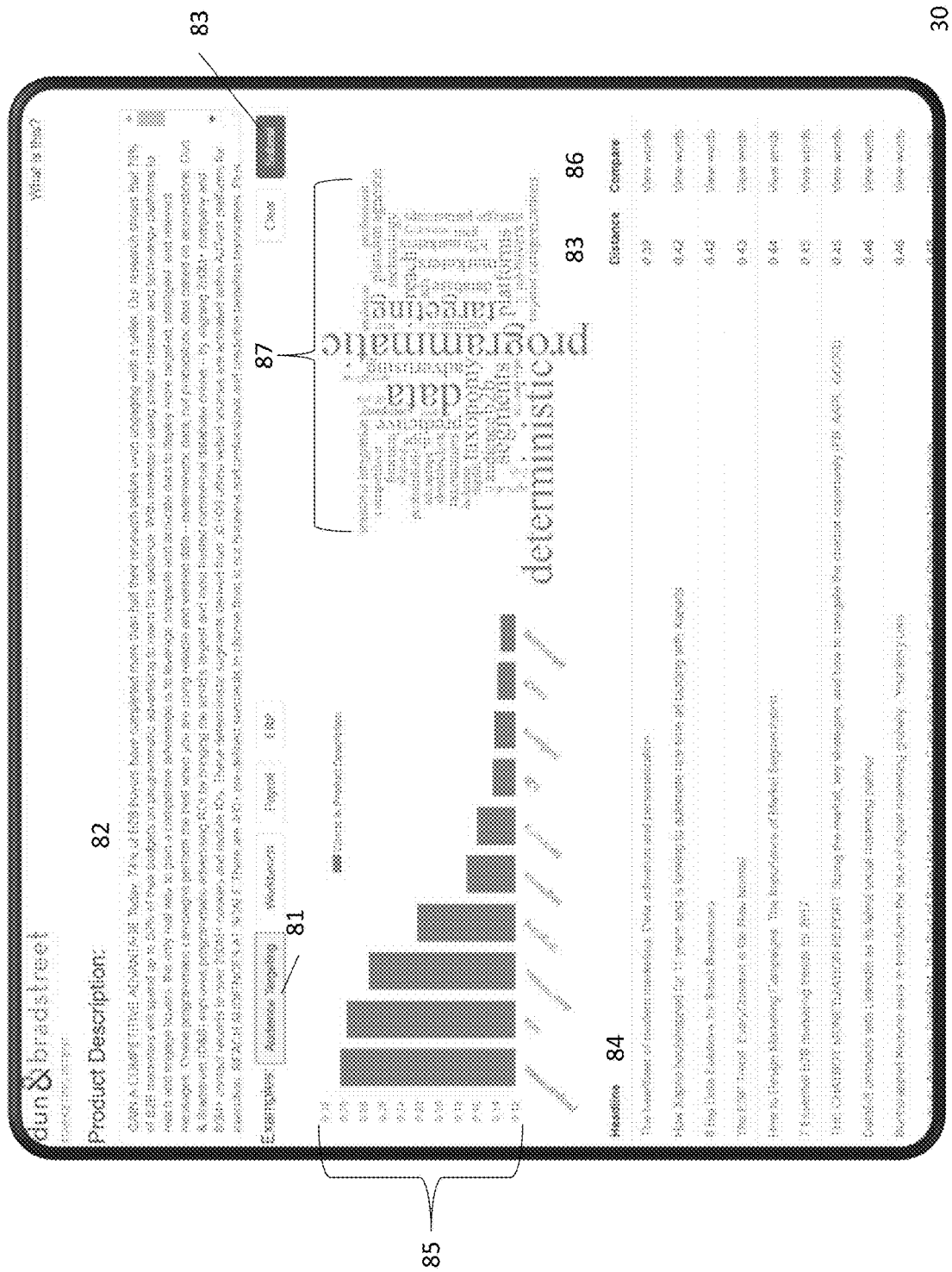
FIG. 6 shows an example graphical user interface according to an embodiment.
Figure 7:
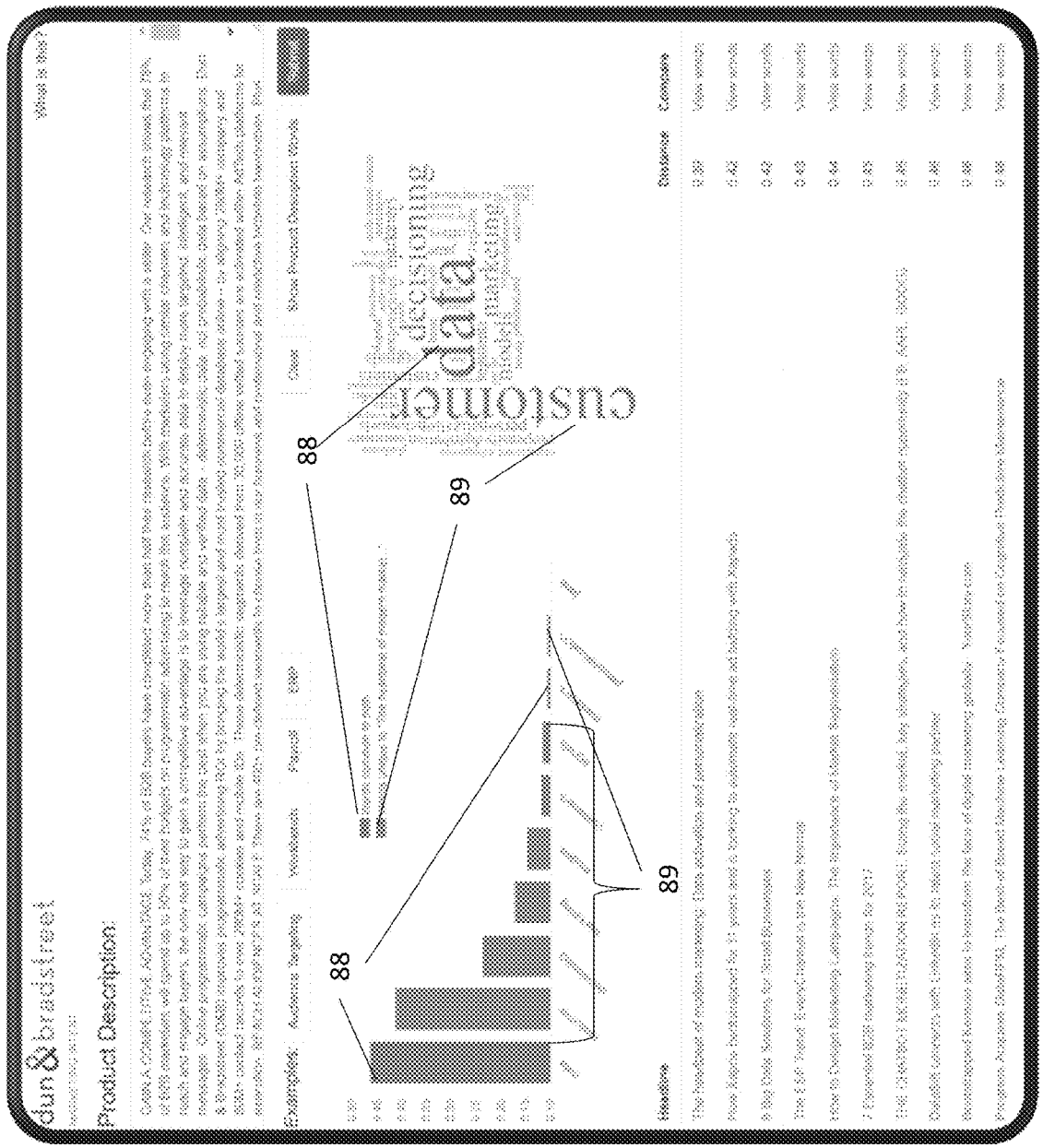
FIG. 7 shows an example graphical user interface according to an embodiment.

Reports can be provided via, inter alia, user interfaces 30 as shown in FIGS. 6-7.

As will be appreciated, in embodiments databases and data therein, though shown in particular modules, can be shared and accessed across components and modules of the system and need not be located in specific components for access to the data for, among other things, semantic direction value analysis as described herein. The logical architecture and operational flows disclosed herein are illustrated to describe embodiments in an exemplary manner without limitations to a specific architecture, as skilled artisans may modify architecture design when, for instance, implementing the teachings of the present disclosure into their own systems.

Illustrative Operating Environment

Figure 3:
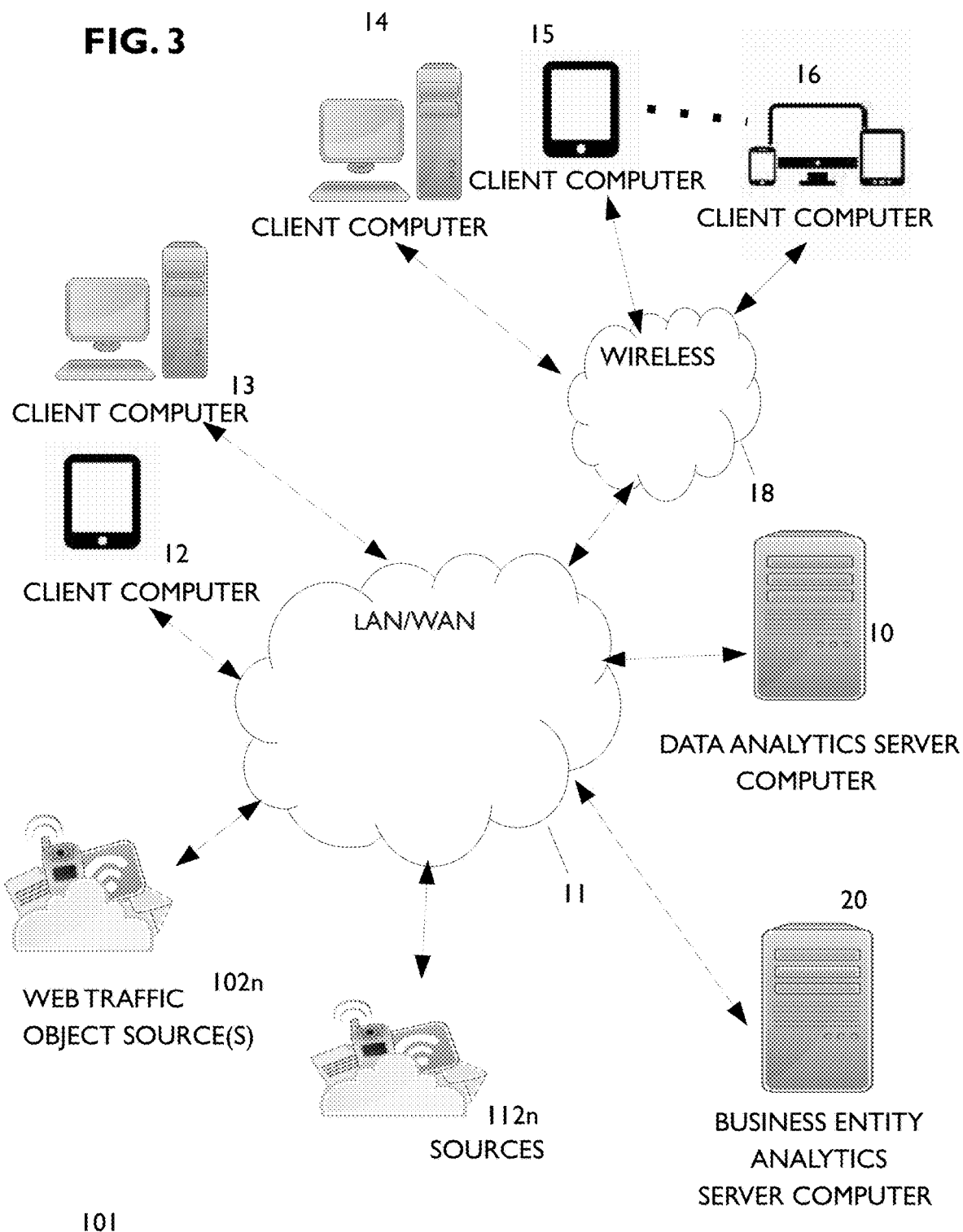
FIG. 3 shows an embodiment of an environment in which the present embodiments can be practiced.

FIG. 3 shows components of an embodiment of an environment 101 in which embodiments of the present disclosure can be practiced. Not all of the components may be required to practice the innovations, and variations in the arrangement and type of the components can be made without departing from the spirit or scope of the present disclosure. As shown, FIG. 3 includes local area networks (LANs)/wide area networks (WANs) network 11, wireless network 18, client computers 12-16, Data Analytics Server Computer 10, a Business Entity Analytics Server Computer 20, Web Traffic Object Sources 102n and Other Data Sources 112n.

At least one embodiment of client computers 12-16 is described in more detail below in conjunction with FIG. 5. In one embodiment, at least some of client computers 12-16 can operate over a wired and/or wireless network, such as networks 11 and/or 18. Generally, client computers 12-16 can include virtually any computer capable of communicating over a network to send and receive information, perform various online activities, offline actions, or the like. In one embodiment, one or more of client computers 12-16 can be configured to operate in a business or other entity to perform a variety of services for the business or other entity. For example, client computers 12-16 can be configured to operate as a web server or an account server. However, client computers 12-16 are not constrained to these services and can also be employed, for example, as an end-user computing node, in other embodiments. It should be recognized that more or less client computers can be included within a system such as described herein, and embodiments are therefore not constrained by the number or type of client computers employed.

Computers that can operate as client computers 12-16 can include computers that typically connect using a wired or wireless communications medium, such as personal computers, multiprocessor systems, microprocessor-based or programmable electronic devices, network PCs, or the like. In some embodiments, client computers 12-16 can include virtually any portable personal computer capable of connecting to another computing device and receiving information, such as, laptop computer 13, smart mobile telephone 12, and tablet computers 15, and the like. However, portable computers are not so limited and can also include other portable devices, such as cellular telephones, radio frequency (RF) devices, infrared (IR) devices, Personal Digital Assistants (PDAs), handheld computers, wearable computers, integrated devices combining one or more of the preceding devices, and the like. As such, client computers 12-16 typically range widely in terms of capabilities and features. Moreover, client computers 12-16 are configured to access various computing applications, including a browser, or other web-based applications.

A web-enabled client computer can include a browser application that is configured to receive and to send web pages, web-based messages, and the like. The browser application can be configured to receive and display graphics, text, multimedia, and the like, employing virtually any web-based language, including wireless application protocol messages (WAP), and the like. In one embodiment, the browser application is enabled to employ Handheld Device Markup Language (HDML), Wireless Markup Language (WML), WMLScript, JavaScript, JavaScript Object Notation (JSON), Standard Generalized Markup Language (SGML), HyperText Markup Language (HTML), eXtensible Markup Language (XML), and the like, to display and send a message. In one embodiment, a user of the client computer can employ the browser application to perform various activities over a network (online). However, another application can also be used to perform various online activities.

Client computers 12-16 can also include at least one other client application that is configured to receive and/or send content with another computer. The client application can include a capability to send and/or receive content, or the like. The client application can further provide information that identifies itself, including a type, capability, name, and the like. In one embodiment, client computers 12-16 can uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Data Analytics Server Computer 10, Business Entity Analytics Server Computer 20, or other computers.

Client computers 12-16 can further be configured to include a client application that enables an end-user to log into an end-user account that can be managed by another computer, such as Data Analytics Server Computer 10, a Business Entity Analytics Server Computer 20, Web Traffic Object Sources 102n and Other Data Sources 112n, or the like. Such end-user account, in one non-limiting example, can be configured to enable the end-user to manage one or more online activities, including in one non-limiting example, search activities, social networking activities, browse various websites, communicate with other users, or the like. However, participation in such online activities can also be performed without logging into the end-user account.

Wireless network 18 is configured to couple client computers 14-16 and its components with network 11. Wireless network 18 can include any of a variety of wireless sub-networks that can further overlay stand-alone ad-hoc networks, and the like, to provide an infrastructure-oriented connection for client computers 14-16. Such sub-networks can include mesh networks, Wireless LAN (WLAN) networks, cellular networks, and the like. In one embodiment, the system can include more than one wireless networks.

Wireless network 18 can further include an autonomous system of terminals, gateways, routers, and the like connected by wireless radio links, and the like. These connectors can be configured to move freely and randomly and organize themselves arbitrarily, such that the topology of wireless network 18 may change rapidly.

Wireless network 18 can further employ a plurality of access technologies including 2nd (2G), 3rd (3G), 4th (4G) 5th (5G) generation radio access for cellular systems, WLAN, Wireless Router (WR) mesh, and the like. Access technologies, such as 2G, 3G, 4G, 5G, and future access networks can enable wide area coverage for mobile devices, such as client computers 14-16 with various degrees of mobility. In one non-limiting example, wireless network 18 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 18 can include virtually any wireless communication mechanism by which information may travel between client computers 14-16 and another computer, network, and the like.

Network 11 is configured to couple network computers with other computers and/or computing devices, including, Data Analytics Server Computer 10, a Business Entity Analytics Server Computer 20, Web Traffic Object Sources 102n and Other Data Sources, client computers 12, 13 and client computers 14-16 through wireless network 18. Network 11 is enabled to employ any form of computer readable media for communicating information from one electronic device to another. Also, network 11 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links in LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signalling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 11 can be configured to transport information of an Internet Protocol (IP). In essence, network 11 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of a server computer that can be employed as a Data Analytics Server Computer 10 or a Business Entity Analytics Server Computer 20 is described in more detail below in conjunction with FIG. 4. Briefly, server computer includes virtually any network computer capable of hosting the modules as described herein. Computers that can be arranged to operate as a server computer include various network computers, including, but not limited to, desktop computers, multiprocessor systems, network PCs, server computers, network appliances, and the like.

Figure 4:
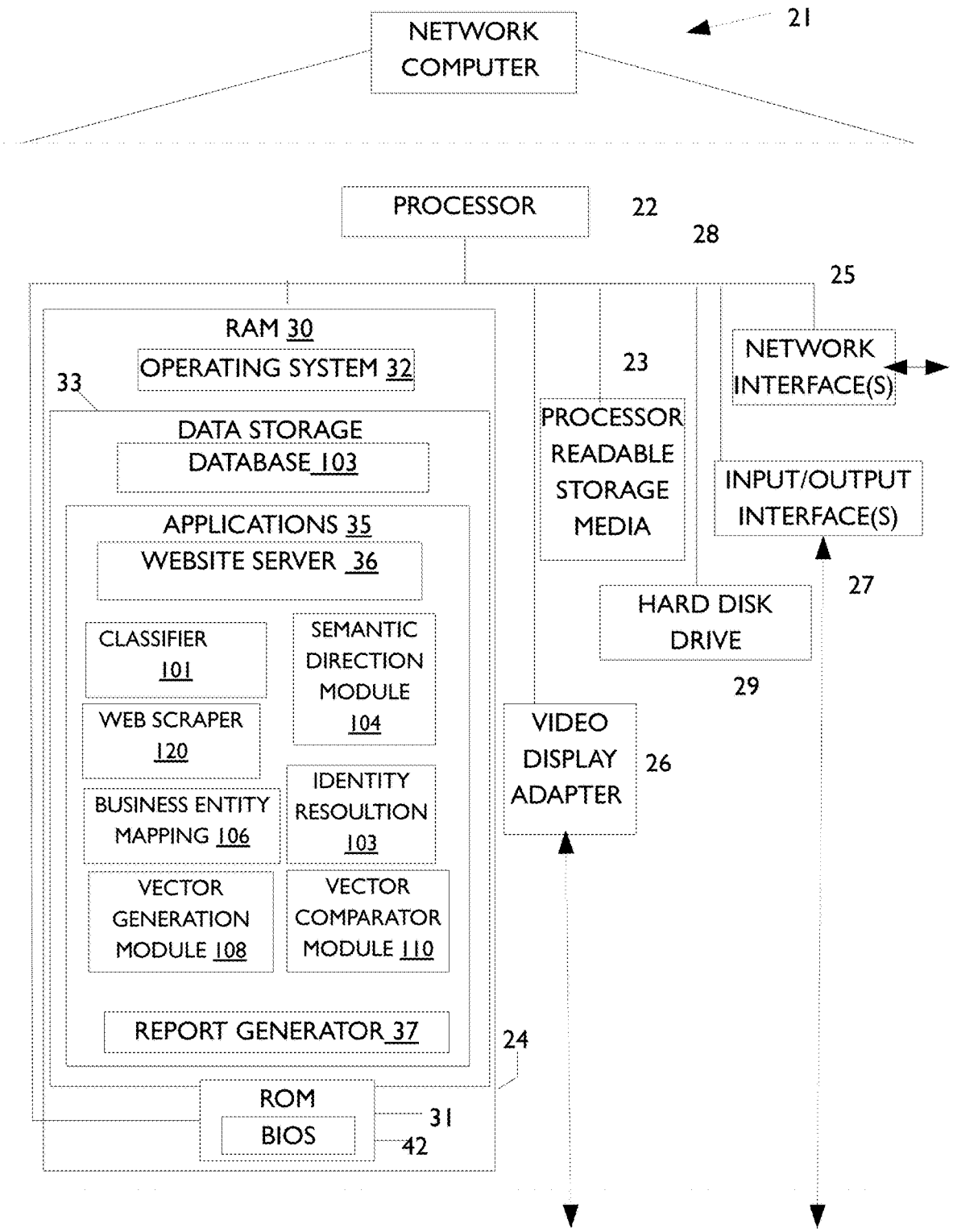
FIG. 4 shows an embodiment of a network computer that can be included in a system such as that shown in FIG. 3.

Although FIG. 4 illustrates each of Data Analytics Server Computer 10 or a Business Entity Analytics Server Computer 20 as a single computer, the present disclosure is not so limited. For example, one or more functions of a server computer can be distributed across one or more distinct network computers. Moreover, the computer servers are not limited to a particular configuration. Thus, in one embodiment, a server computer can contain a plurality of network computers. In another embodiment, a server computer can contain a plurality of network computers that operate using a master/slave approach, where one of the plurality of network computers of the server computers are operative to manage and/or otherwise coordinate operations of the other network computers. In other embodiments, a server computer can operate as a plurality of network computers arranged in a cluster architecture, a peer-to-peer architecture, and/or even within a cloud architecture. Thus, the present disclosure is not to be construed as being limited to a single environment, and other configurations, and architectures are also envisaged.

Although illustrated separately, Data Analytics Server Computer 10 and Business Entity Analytics Server Computer 20 can be employed as a single network computer or computer platform, separate network computers, a cluster of network computers, or the like. In some embodiments, either Data Analytics Server Computer 10 and Business Entity Analytics Server Computer 20, or both, can be enabled to deliver content, respond to user interactions with the content, track user interaction with the content, update widgets and widgets controllers, or the like. Moreover, Data Analytics Server Computer 10 and Business Entity Analytics Server Computer 20 are described separately, and it will be appreciated that these servers hosted by or can be configured to operate on other platforms.

Illustrative Network Computer

FIG. 4 shows one embodiment of a network computer 21 according to one embodiment of the present disclosure. Network computer 21 can include many more or less components than those shown. The components shown, however, are sufficient to disclose an illustrative embodiment for practicing the invention. Network computer 21 can be configured to operate as a server, client, peer, a host, or any other computer. Network computer 21 can represent, for example Data Analytics Server Computer 10 and/or Business Entity Analytics Server Computer 20 of FIG. 3, and/or other network computers.

Network computer 21 includes processor 22, processor readable storage media 23, network interface unit 25, an input/output interface 27, hard disk drive 29, video display adapter 26, and memory 24, all in communication with each other via bus 28. In some embodiments, processor 22 can include one or more central processing units.

As illustrated in FIG. 4, network computer 21 also can communicate with the Internet, or some other communications network, via network interface unit 25, which is constructed for use with various communication protocols including the TCP/IP protocol. Network interface unit 25 is sometimes known as a transceiver, transceiving device, or network interface card (NIC).

Network computer 21 also comprises input/output interface 27 for communicating with external devices, such as a keyboard, or other input or output devices not shown in FIG. 12. Input/output interface 27 can utilize one or more communication technologies, such as USB, infrared, Bluetooth™, or the like.

Memory 24 generally includes a Random Access Memory (RAM) 54, a Read Only Memory (ROM) 55 and one or more permanent mass storage devices, such as hard disk drive 29, tape drive, optical drive, and/or floppy disk drive. Memory 24 stores operating system 32 for controlling the operation of network computer 21. Any general-purpose operating system can be employed. Basic input/output system (BIOS) 42 is also provided for controlling the low-level operation of network computer 21.

Although illustrated separately, memory 24 can include processor readable storage media 23. Processor readable storage media 23 may be referred to and/or include computer readable media, computer readable storage media, and/or processor readable storage device. Processor readable storage media 23 can include volatile, non-volatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media that can be used to store the desired information and which can be accessed by a computer.

Memory 24 further includes one or more data storage 33, which can be utilized by network computer 21 to store, among other things, applications 35 and/or other data. For example, data storage 33 can also be employed to store information that describes various capabilities of network computer 21. The information can then be provided to another computer based on any of a variety of events, including being sent as part of a header during a communication, sent upon request, or the like. Data storage 33 can also be employed to store messages, web page content, or the like. At least a portion of the information can also be stored on another component of network computer 21, including, but not limited to processor readable storage media 23, hard disk drive 29, or other computer readable storage medias (not shown) within network computer 21.

Data storage 33 can include a database, text, spreadsheet, folder, file, or the like, that may be configured to maintain and store user account identifiers, user profiles, email addresses, IM addresses, and/or other network addresses; or the like.

In at least one of the various embodiments, data storage 33 can include databases, for example word database(s) 109, and other databases that can contain information determined from web analysis and network activity metrics as described herein, for example, unique visits (date-time stamps, IP address) and unique visitors (different cookies, different IP addresses).

Data storage 33 can further include program code, data, algorithms, and the like, for use by a processor, such as processor 22 to execute and perform actions. In one embodiment, at least some of data storage 33 might also be stored on another component of network computer 21, including, but not limited to processor-readable storage media 23, hard disk drive 29, or the like.

Applications 35 can include computer executable instructions, which may be loaded into mass memory and run on operating system 32. Examples of application programs can include transcoders, schedulers, calendars, database programs, word processing programs, Hypertext Transfer Protocol (HTTP) programs, customizable user interface programs, IPsec applications, encryption programs, security programs, SMS message servers, IM message servers, email servers, account managers, and so forth. Applications 35 can also include website server 36, Language Processing Classifier 101, a Web Scraper Module for web traffic data content 102, Business Entity Identity Resolution Module 103, Semantic Direction Module 104, Business Entity Mapping Module 106, Vector Generation Module 108, Vector Comparator Module 110, and Report Generator 37.

Website server 36 can represent any of a variety of information and services that are configured to provide content, including messages, over a network to another computer. Thus, website server 36 can include, for example, a web server, a File Transfer Protocol (FTP) server, a database server, a content server, or the like. Website server 36 can provide the content including messages over the network using any of a variety of formats including, but not limited to WAP, HDML, WML, SGML, HTML, XML, Compact HTML (cHTML), Extensible HTML (xHTML), or the like.

Language Processing Classifier 101, a Web Scraper Module for web traffic data content 102, Business Entity Identity Resolution Module 103, Semantic Direction Module 104, Business Entity Mapping Module 106, Vector Generation Module 108, Vector Comparator Module 110, and Report Generator 37 can be operative on or hosted and operative on Data Analytics Server Computer 10 and/or Business Entity Analytics Server Computer 20 of FIG. 3. Report Generator 37 can employ processes, or parts of processes, similar to those described in conjunction with FIGS. 1-2 to perform at least some of its actions.

Report Generator 37 can be arranged and configured to determine and/or generate reports based on the user filters and controls similar to those described above with reference to the user interface 30 controls. Also, Report Generator 37 can be configured to output a tailored report, either in the form of publishing software application which prepares and outputs a listing in a convenient-to-read form, or the same information output in a format suitable for automatic input and processing by another software product, for example plain text for a publishing program such as LaTeX. In at least one of the various embodiments, Report Generator 37 can be operative on or hosted and operative on Data Analytics Server Computer 10 and/or Business Entity Analytics Server Computer 20 of FIG. 3. Report Generator 37 can employ processes, or parts of processes, similar to those described in conjunction with FIGS. 1-2 to perform at least some of its actions. Report Generator can be employed to output reports for the interfaces as shown in FIGS. 6-7.

Illustrative Client Computer

Figure 5:
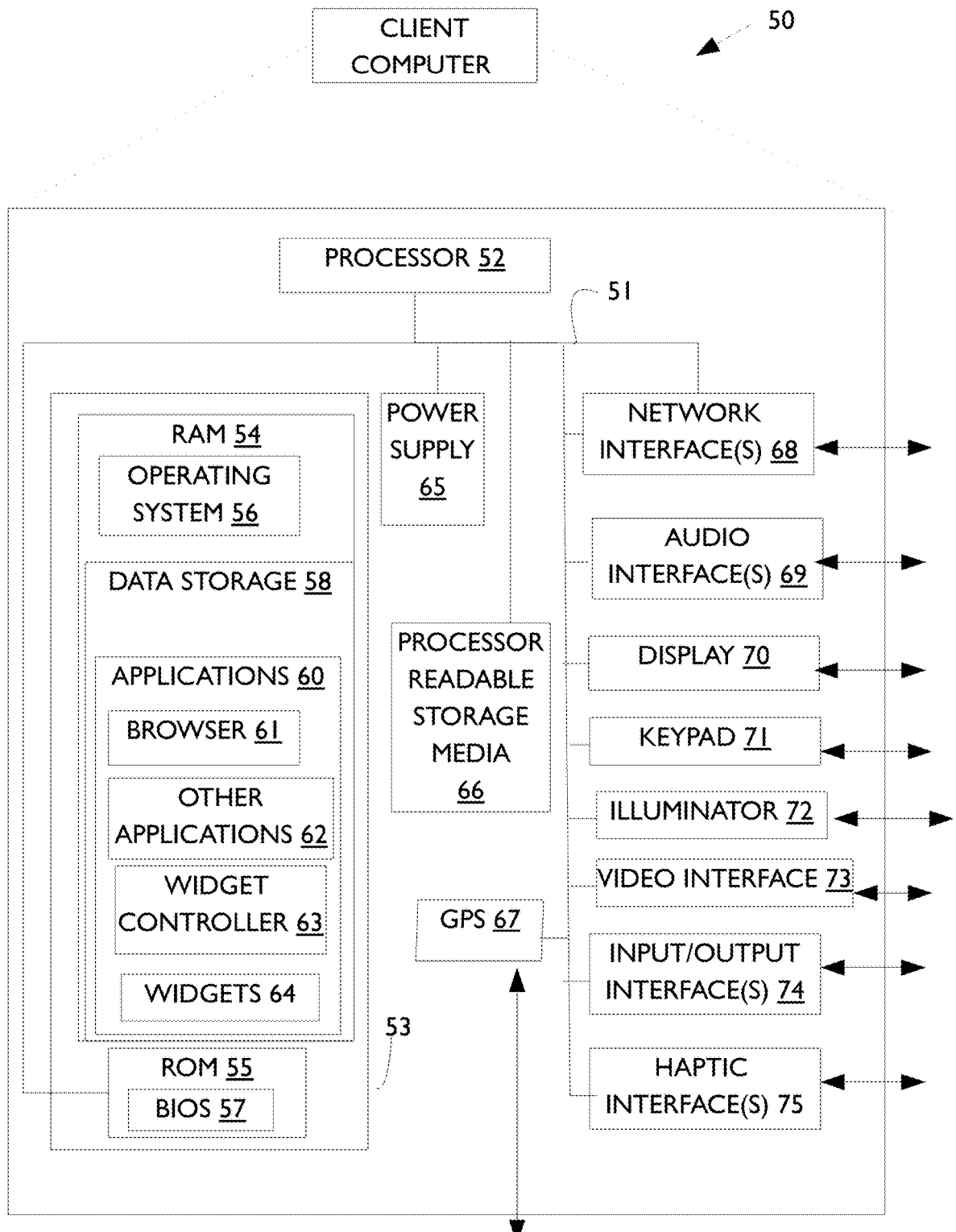
FIG. 5 shows an embodiment of a client computer that can be included in a system such as that shown in FIG. 3.

Referring to FIG. 5, Client Computer 50 can include many more or less components than those shown in FIG. 13. However, the components shown are sufficient to disclose an illustrative embodiment for practicing the innovations described herein.

Client Computer 50 can represent, for example, one embodiment of at least one of Client Computers 12-16 of FIG. 3.

As shown in the figure, Client Computer 50 includes a processor 52 in communication with a mass memory 53 via a bus 51. In some embodiments, processor 52 includes one or more central processing units (CPU). Client Computer 50 also includes a power supply 65, one or more network interfaces 68, an audio interface 69, a display 70, a keypad 71, an illuminator 72, a video interface 73, an input/output interface 74, a haptic interface 75, and a global positioning system (GPS) receiver 67.

Power supply 65 provides power to Client Computer 50. A rechargeable or non-rechargeable battery can be used to provide power. The power can also be provided by an external power source, such as an alternating current (AC) adapter or a powered docking cradle that supplements and/or recharges a battery.

Client Computer 50 may optionally communicate with a base station (not shown), or directly with another computer. Network interface 68 includes circuitry for coupling Client Computer 50 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 68 is sometimes known as a transceiver, transceiving device, or network interface card (NIC).

Audio interface 69 is arranged to produce and receive audio signals such as the sound of a human voice. For example, audio interface 69 can be coupled to a speaker and microphone (not shown) to enable telecommunication with others and/or generate an audio acknowledgement for some action.

Display 70 can be a liquid crystal display (LCD), gas plasma, light emitting diode (LED), organic LED, or any other type of display used with a computer. Display 70 can also include a touch sensitive screen arranged to receive input from an object such as a stylus or a digit from a human hand.

Keypad 71 can comprise any input device arranged to receive input from a user. For example, keypad 71 can include a push button numeric dial, or a keyboard. Keypad 71 can also include command buttons that are associated with selecting and sending images. Illuminator 72 can provide a status indication and/or provide light. Illuminator 72 can remain active for specific periods of time or in response to events. For example, when illuminator 72 is active, it can backlight the buttons on keypad 71 and stay on while the Client Computer is powered. Also, illuminator 72 can backlight these buttons in various patterns when particular actions are performed, such as dialing another client computer. Illuminator 72 can also cause light sources positioned in a transparent or translucent case of the client computer to illuminate in response to actions.

Video interface 73 is arranged to capture video images, such as a still photo, a video segment, an infrared video, or the like. For example, video interface 73 can be coupled to a digital video camera, a web-camera, or the like. Video interface 73 can comprise a lens, an image sensor, and other electronics. Image sensors may include a complementary metal-oxide-semiconductor (CMOS) integrated circuit, charge coupled device (CCD), or any other integrated circuit for sensing light.

Client Computer 50 also comprises input/output interface 74 for communicating with external devices, such as a headset, or other input or output devices not shown in FIG. 13. Input/output interface 74 can utilize one or more communication technologies, such as USB, infrared, Bluetooth™, or the like.

Haptic interface 75 is arranged to provide tactile feedback to a user of the Client Computer 50. For example, the haptic interface 75 can be employed to vibrate Client Computer 50 in a particular way when another user of a computing computer is calling. In some embodiments, haptic interface 75 is optional.

Client Computer 50 can also include GPS transceiver 67 to determine the physical coordinates of Client Computer 50 on the surface of the Earth. GPS transceiver 67, in some embodiments, is optional. GPS transceiver 67 typically outputs a location as latitude and longitude values. However, GPS transceiver 67 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of Client Computer 50 on the surface of the Earth. It is understood that under different conditions, GPS transceiver 67 can determine a physical location within millimeters for client computer 50. In other cases, the determined physical location may be less precise, such as within a meter or significantly greater distances. In one embodiment, however, Client Computer 50 can, through other components, provide other information that can be employed to determine a physical location of the computer, including for example, a Media Access Control (MAC) address, IP address, or the like.

Mass memory 53 includes a Random Access Memory (RAM) 54, a Read-only Memory (ROM) 55, and other storage means. Mass memory 53 illustrates an example of computer readable storage media (devices) for storage of information such as computer readable instructions, data structures, program modules or other data. Mass memory 53 stores a basic input/output system (BIOS) 57 for controlling low level operation of Client Computer 50. The mass memory also stores an operating system 56 for controlling the operation of Client Computer 50. It will be appreciated that this component can include a general-purpose operating system such as a version of UNIX, or LINUX™, or a specialized client communication operating system such as Microsoft Corporation's Windows™ OS, Apple Corporation's iOS™, Google Corporation's Android™ or the Symbian® operating system. The operating system can include, or interface with a Java virtual machine module that enables control of hardware components and/or operating system operations via Java application programs.

Mass memory 53 further includes one or more data storages 58 that can be utilized by Client Computer 50 to store, among other things, applications 60 and/or other data. For example, data storage 58 can also be employed to store information that describes various capabilities of Client Computer 50. The information can then be provided to another computer based on any of a variety of events, including being sent as part of a header during a communication, sent upon request, or the like. Data storage 58 can also be employed to store social networking information including address books, buddy lists, aliases, user profile information, or the like. Further, data storage 58 can also store message, web page content, or any of a variety of user generated content. At least a portion of the information can also be stored on another component of Client Computer 50, including, but not limited to processor readable storage media 66, a disk drive or other computer readable storage devices (not shown) in Client Computer 50.

Processor readable storage media 66 can include volatile, non-volatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium that can be used to store the desired information and which can be accessed by a computer. Processor readable storage media 66 is also referred to herein as computer readable storage media and/or computer readable storage device.

Applications 60 can include computer executable instructions which, when executed by Client Computer 50, transmit, receive, and/or otherwise process network data. Network data includes, but is not limited to, messages (e.g. SMS, Multimedia Message Service (MMS), instant message (IM), email, and/or other messages), audio, video, and enable telecommunication with another user of another Client Computer 50.

Applications 60 can include, for example, browser 61, and other applications 62. Other applications 62 include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 61 can include virtually any application configured to receive and display graphics, text, multimedia, messages, and the like, employing virtually any web based language. In one embodiment, the browser application employs HDML, WML, WMLScript, JavaScript, JSON, SGML, HTML, XML, and the like, to display and send a message. However, any of a variety of other web-based programming languages can be employed. In one embodiment, browser 61 enables a user of Client Computer 50 to communicate and interface with another network computer, such as Data Analytics Server Computer 10, a Business Entity Analytics Server Computer 20, Web Traffic Object Sources 102n and Other Data Sources 112n of FIG. 3 such that a user can operate a user interface 30 as described herein.

Applications 60 can also include Widget Controller 63 and one or more Widgets 64. Widgets 64 can be collections of content provided to the Client Computer by Data Analytics Server Computer 10, a Business Entity Analytics Server Computer 20, Web Traffic Object Sources 102n and Other Data Sources 112n. Data Analytics Server Computer 10, a Business Entity Analytics Server Computer 20, Web Traffic Object Sources 102n and Other Data Sources 112n of FIG. 3. Widget Controller 63 and Widgets 64 can run as native Client Computer applications, or they can run in Browser 61 as web browser-based applications. Also, Widget Controller 63 and Widgets 64 can be arranged to run as native applications or web browser applications, or combination thereof. In one embodiment, browser 61 employs Widget Controller 63 and Widgets 64 to enable a user of Client Computer 50 to communicate and interface with another network computer, such as Data Analytics Server Computer 10, a Business Entity Analytics Server Computer 20, Web Traffic Object Sources 102n and Other Data Sources 112n of FIG. 3 such that a user can operate a user interface 30 as described herein.

Illustrative Graphical User Interface

Referring to FIGS. 6-7, in at least one of the various embodiments, user interfaces other than user interfaces 30 described below, can be employed without departing from the spirit and/or scope of the present disclosure. Such user interfaces can have more or fewer user interface elements that are arranged in various ways. In some embodiments, user interfaces can be generated using web pages, mobile applications, emails, PDF documents, text messages, or the like. In at least one of the various embodiments, Language Processing Classifier 101, Web Scraper Module for web data traffic content 102, Identity Resolution Module 103, Semantic Direction Module 104, Business Entity Mapping Module 106, Vector Generation Module 108, Vector Comparator Module 110, and Report Generator 37 can include processes and/or API's for generating user interfaces, such as, user interfaces 30.

The user interface unit 30 is now described in more detail. As shown in FIG. 6, the interface 30 can be configured for, inter alia, audience targeting 81 using semantic directions. In an embodiment, the system produces a display showing semantic distance values 83 for words and web content (e.g. articles) 84 visited by mapped and tracked entities and a product description 82. The interface includes an interface object 80 that allows the user to enter and submit a product description as described herein. For example, as described herein, the product descriptions can be obtained from a set of documented product definitions, for example payroll management software as software used for tracking, or sets of representative product documentation, for example, a web page from a company that sells payroll management products and another web page for a different payroll management product. The interface 30 includes an interface object 86 that allows the user to view and compare the product description words. The interface 30 can be configured to show words common to both the product descriptions and web pages and words unique to one or more selected web pages 84 (e.g., a page including an article with a given headline). The interface can be configured to show, for example, a word map 87 visually depicting the word weights for the semantic values of the product description words. The interface 30 can be configured to show other graphics, for example, a bar graph 85 visually depicting the term frequency weights for the product description words.

As shown in FIG. 7, the user can select a filter to show product description words. For example, the graphics (e.g. bar graph 85 and word map 87) can show words common to both the product descriptions and web pages 88 in one color or pattern and words unique to one or more selected web pages 88 (e.g.: a page including an article with a given headline).

The user interface 30 has been described using the example of a dashboard suitable for a personal computer, as this is an amenable form for the purpose of explanation. Similar graphical user interfaces with a dashboard format can also be provided as a mobile app, e.g. for Android or iPhone operating systems, where the term "mobile app" refers primarily to a module of applications software capable of running on a smart phone or tablet device or other client computer. Other types of user interface can also be provided. An alternative user interface type is an application programming interface (API), which is the type of user interface which would be suitable for developers who wish to integrate the system as described herein with a third-party software application, e.g. to incorporate outputs in a flexible manner suited to the third party applications software which is being integrated. Another user interface type would be a report writing software application, which, based on user filters and controls similar to those described above with reference to the dashboard, will output a tailored report.

The operation of certain aspects of the present disclosure have been described with respect to flowchart illustrations. In at least one of various embodiments, processes described in conjunction with FIGS. 1 to 7, can be implemented by and/or executed on a single network computer. In other embodiments, these processes or portions of these processes can be implemented by and/or executed on a plurality of network computers. Likewise, in at least one of the various embodiments, processes or portions thereof, can operate on one or more client computers, such as client computer. However, embodiments are not so limited, and various combinations of network computers, client computers, virtual machines, or the like can be used. Further, in at least one of the various embodiments, the processes described in conjunction with the flowchart illustrations can be operative in system with logical architectures, such as those described in herein.

It will be understood that each block of the flowchart illustrations described herein, and combinations of blocks in the flowchart illustrations, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present disclosure.

Accordingly, blocks of the flowchart illustrations support combinations for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions. The foregoing examples should not be construed as limiting and/or exhaustive, but rather, as illustrative use cases to show an implementation of at least one of the various embodiments of the present disclosure.

What is claimed is:

1. A method being performed by a computer system that comprises one or more processors and a non-transitory computer-readable storage medium encoded with instructions executable by at least one of the processors and operatively coupled to at least one of the processors, the method comprising:

analyzing a set of web data traffic content for a website;

mapping the web data traffic content to a business entity identifier to identify a business entity visiting the website;

mapping the web data traffic content to personnel data for the business entity associated with the business entity identifier to identify business personnel associated with the business entity visiting the website;

generating a word database comprising words from the webpage at the webpage address for each webpage address of the website accessed by the business entity or the business personnel associated with the business entity identifier;

analyzing the word database with a machine learning Language Processing classifier comprising a vector comparator comprising a word vector classifier;

generating a semantic direction value for the word database; and identifying the business entity intent based on the semantic direction value, wherein the Language Processing classifier is configured to employ a language-model-based classifier module to generate the word embeddings by mapping each word to a vector to produce a set of contextual information that is related to the word being mapped.

2. The method of claim 1, further comprising: calculating, for a given business entity identifier, a number of other, unique business entity identifiers in a business organizational tree for the given business entity identifier.

3. The method of claim 1, further comprising:

generating the semantic direction value for the word database and a semantic direction value for an identified product or product family.

4. The method of claim 1, further comprising:

collecting a number of the unique visitors to the website associated with the business entity identifier during a plurality of time intervals for a period of time;

calculating a statistical estimate of the number of unique visitors for the period of time;

performing the analysis using one or more time windows;

identifying any deviations by detecting a shift; and calculating the magnitude of the shifts.

5. The method of claim 4, further comprising:

collecting the number of the unique visitors to the website associated with the business organizational tree for the given business entity identifier for the period of time.

6. The method of claim 4 wherein the statistical estimate is at least one selected from the group consisting of: an inner quartile range and a median absolute deviation of the number of unique visitors.

7. The method of claim 4 wherein the statistical estimate comprises at least one statistical estimate selected from the group consisting of: an inner quartile range and a median absolute deviation of the number of unique visitors and unique business entity identifiers in the business organizational tree.

8. The method of claim 4, further comprising:

establishing the plurality of time windows for the plurality of time intervals, the plurality of time intervals including different time intervals;

recalculating the statistical estimate of the number of unique visitors for the period of time for each the plurality of time windows; and calculating the magnitude of the shift based on the recalculations for the time windows.

9. The method of claim 8, wherein one of the different time intervals is a week, and the unique visitors are collected at the weekly intervals for the period of time from between about three to twelve weeks.

10. The method of claim 8, wherein the plurality of different time intervals comprises:

at least one time interval selected from the group consisting of: a weekly time interval, a bi-weekly interval, a monthly interval, a bi-monthly interval, and a quarterly interval.

11. The method of claim 1, wherein the web data traffic content comprises:

at least one web data traffic content selected from the group consisting of: a web page content being accessed, a mobile ID, an IP address, and a web browser cookie.

12. The method of claim 1, further comprising:

outputting a report identifying one or more business entities demonstrating an increased interest based on the semantic direction value.

13. The method of claim 12, further comprising:

identifying the one or more business entities that are not existing customers of an entity requesting the report.

14. The method of claim 3, further comprising:

calculating the similarity of the semantic direction for the webpage and the semantic direction for the product or family of products.

15. The method of claim 14, further comprising:

calculating a cosine angle or a Euclidean distance for the semantic direction for the webpage and the semantic direction for the product or family of products.

16. The method of claim 3, further comprising:

generating a taxonomy of product types based on a representative product content.

17. The method of claim 16, further comprising:

calculating a semantic direction for a representative set of products;

employing a machine learning algorithm that includes a database of product categories or text definitions for products to correlate the semantic direction with one or more entities; and defining a target product audience based on the correlation.

18. The method of claim 17 wherein a semantic frequency comprises at least one semantic frequency model comprising an inverse document frequency module.

19. The method of claim 18, further comprising:

establishing the word embeddings model comprising a semantic vector generated for a dictionary which includes singular words (unigrams) and groups of words (n-grams), wherein the frequency of co-occurrence of words within a defined window within the corpus creates a correlation between words that generates a semantic relationship between words;

identifying the n-grams across the corpus such that unigrams within an n-gram are not represented in the analysis;

removing stopwords from the corpus;

employing a term frequency and weighting to the inverse document frequency model (TF-IDF) to weight the n-grams or words in the groups of content provided, wherein each n-gram in the document is given a weight that increases the importance of this n-gram based on the frequency the n-gram is used in the document, the frequency the n-gram is used in other documents, or both; and summing each n-gram, i, across all $n_j$ n-grams in the $j^{th}$ document, $d_j$, in the corpus, weighted by the $i^{th}$ weight from the TF-IDF weighting, $w_i$, and the related word embedding from the word embedding model, W[i], gives the semantic direction, $s_j$:

$$s_j = \sum_{i \in d_j} w_{i,j} \cdot W[i].$$

20. The method of claim 19, wherein the word embeddings model is configured to translate the n-gram into a 300-dimensional numeric vector.

21. The method of claim 19, wherein the n-gram is given greater weight if the n-gram is frequently used in the document, less frequently used in other documents, or both.

22. The method of claim 18, wherein the machine learning algorithm comprises a neural net classifier configured to produce contextual semantic values.

23. A computer program stored on a non-transitory computer readable medium and loadable into the internal memory of a digital computer, comprising software code portions, when said program is run on a computer, for performing the method of claim 1.

24. A computer program product storing the computer program of claim 23.

25. A computer system comprising:
a network computer, including:
   a transceiver for communicating over the network;
   a non-transitory memory for storing at least instructions and a word database; and
   a processor device that is operative to execute instructions that enable actions, comprising:
   analyzing a set of web data traffic content for a website:
   mapping the web data traffic content to a business entity identifier to identify a business entity visiting the website;
   mapping the web data traffic content to personnel data for the business entity associated with the business entity identifier to identify business personnel associated with the business entity visiting the website;
   generating a word database comprising words from the webpage at the webpage address for each webpage address of the website accessed by the business entity or the business personnel associated with the business entity identifier;
   analyzing the word database with a machine learning Language Processing classifier comprising a vector comparator comprising a word vector classifier;
   generating a semantic direction value for the word database; and
   identifying the business entity intent based on the semantic direction value,
   wherein the Language Processing classifier is configured to employ a language-model-based classifier module to generate the word embeddings by mapping each word to a vector to produce a set of contextual information that is related to the word being mapped.

* * * * *